US010326777B2

(12) United States Patent
Demopoulos et al.

(10) Patent No.: US 10,326,777 B2
(45) Date of Patent: Jun. 18, 2019

(54) INTEGRATED DATA TRAFFIC MONITORING SYSTEM

(71) Applicant: THE BARRIER GROUP, LLC, Ramsey, MN (US)

(72) Inventors: Robert James Demopoulos, Champlin, MN (US); David James Fladebo, New Plague, MN (US)

(73) Assignee: The Barrier Group, Ramsey, MN (US)

( * ) Notice: Subject to any disclaimer, the term of this patent is extended or adjusted under 35 U.S.C. 154(b) by 922 days.

(21) Appl. No.: 14/480,299

(22) Filed: Sep. 8, 2014

(65) Prior Publication Data
US 2014/0380456 A1 Dec. 25, 2014

Related U.S. Application Data

(63) Continuation of application No. 12/592,580, filed on Nov. 27, 2009, now Pat. No. 8,832,833, which is a
(Continued)

(51) Int. Cl.
*G06F 21/55* (2013.01)
*H04L 12/24* (2006.01)
(Continued)

(52) U.S. Cl.
CPC ........ *H04L 63/1408* (2013.01); *G06F 21/552* (2013.01); *H04L 51/12* (2013.01); *H04L 63/0209* (2013.01); *H04L 63/0236* (2013.01); *H04L 63/0245* (2013.01); *H04L 63/0254* (2013.01); *H04L 63/0263* (2013.01);
(Continued)

(58) Field of Classification Search
CPC .......................... H04L 67/02; H04L 67/2833; H04L 63/101; H04L 43/00; H04L 63/1408; H04L 63/20; H04L 63/0227; H04L 51/12; H04L 63/0209; H04L 63/0236; H04L 63/0245; H04L 63/0263; H04L 63/1416; H04L 63/1425; H04L 63/1441; H04L 63/145;
(Continued)

(56) References Cited

U.S. PATENT DOCUMENTS

| 6,678,827 B1* | 1/2004 | Rothermel | H04L 29/06 709/223 |
| 2002/0087882 A1* | 7/2002 | Schneier | G06F 21/552 726/23 |
| 2005/0193430 A1* | 9/2005 | Cohen | H04L 63/1433 726/25 |

* cited by examiner

*Primary Examiner* — Tamara T Kyle
(74) *Attorney, Agent, or Firm* — Skaar Ulbrich Macari, P.A.

(57) ABSTRACT

The present invention includes an integrated data traffic monitoring system monitoring data traffic received from a communication network and destined for a protected network. The monitoring system includes a security appliance and one or more security and monitoring technologies such as hardware and open source and proprietary software products. The security appliance and the security and monitoring technologies may be implemented as separate and distinct modules or combined into a single security appliance. The security and monitoring technologies monitor network data traffic on, or directed to, the protected network. The monitoring system collects data from each of the technologies into an event database and, based on the data, automatically generates rules directing one or more of the technologies to prevent subsequent communications traffic from specific sources from entering the protected network.

20 Claims, 10 Drawing Sheets

Related U.S. Application Data continuation of application No. 11/042,493, filed on Jan. 24, 2005, now abandoned, which is a continuation of application No. 10/768,931, filed on Jan. 29, 2004, now abandoned.

(60) Provisional application No. 60/538,960, filed on Jan. 23, 2004.

(51) Int. Cl.
*H04L 12/58* (2006.01)
*H04L 29/06* (2006.01)

(52) U.S. Cl.
CPC ........ *H04L 63/0281* (2013.01); *H04L 63/145* (2013.01); *H04L 63/1416* (2013.01); *H04L 63/1425* (2013.01); *H04L 63/1441* (2013.01); *H04L 63/1458* (2013.01); *H04L 63/1466* (2013.01); *H04L 63/1475* (2013.01); *H04L 41/16* (2013.01)

(58) Field of Classification Search
CPC ............. H04L 63/1458; H04L 63/1466; H04L 63/1475; G06F 21/552
See application file for complete search history.

INTEGRATED DATA TRAFFIC MONITORING SYSTEM

PRIORITY

The present application is continuation of U.S. application Ser. No. 12/592,580, filed Nov. 27, 2009, which is a continuation of U.S. application Ser. No. 11/042,493, filed Jan. 24, 2005, which is a continuation of U.S. application Ser. No. 10/768,931, filed Jan. 29, 2004, which claims priority benefit of U.S. Provisional Application No. 60/538,960, filed Jan. 23, 2004. All of these applications are hereby incorporated by reference herein in their entirety.

FIELD

This application relates generally to monitoring data traffic related to computing systems, and more particularly to an integrated system for monitoring data traffic.

BACKGROUND

Security is now a very important aspect of any computing system connected to the Internet. In order to provide protection from different types of security threats, a typical computing system may employ a significant number of technologies to monitor the computing system and, in some cases, perform actions to protect the computing system from identified threats or potential threats. These technologies will be referred generally throughout this specification as monitor modules. Some common monitor modules and their functions include:

Stateful firewall—An industry standard method of network connection monitoring, control and protection;
Application awareness—Inspecting network connections for proper application behavior protecting a network from common application vulnerabilities;
DHCP—Provides IP address and other network parameters to network users;
IDS—Intrusion Detection System, detects attacks;
IDP—Intrusion Detection and Prevention, detects and prevents attacks;
HIDS—Host-based Intrusion Detection systems, detects attacks and changes on the security device itself;
Service proxy and cache server—Isolates users from the Internet, controls their access and improves speed of Internet use;
Email forwarder with masking—Isolates and controls incoming or outbound Email;
WEB forwarder with masking—Isolates, protects and controls incoming or outbound WEB service requests;
Anti-SPAM—Prevents the majority of unsolicited Email requests;
Web content filter—Protects organizations from access to or from unacceptable WEB sites and content;
Anti-virus filter—Examines incoming Email and other services for the presence of viruses and removes them;
Email content filter—Controls the content of Email messages to protect against SPAM and unacceptable content;
Multiple DMZ—The ability to segregate a customer's network into isolated "De-Militarized Zones", provides protection by isolation;
VPN Concentrator—Allows for connection from anywhere in the world to a "Virtual Private Network" that from a remote site appears as a single network segment;
VPN Initiator—Connects to other VPN concentrators;
Site-to-site VPN with full mesh option—Allows for the creation of large private network utilizing inexpensive public Internet connections. Useful for companies with small branch or remote offices/locations;
Encryption at all levels—All data transferred or stored in an encrypted or encoded format;
Honey Pot—A method to trap intruders and to track attackers;
SSH/SSHD—A secure method of communicating and managing security appliances and services;
Automatic updates via WEB—Self-maintaining, correcting, updating and reporting mechanisms;
HA/Cluster implementation—High-availability redundant capability that can grow as required depending on performance requirements;
Common web-enabled management interface—All technologies and services are managed by a common WEB based interface;
SAMBA, LDAP support—Windows network file system and user awareness;
Full identification, authentication and authorization (AAA) support—Method to ensure proper user access and logging of user connection to network resources;
Multi factor identification required for device management—More extensive methods used for administrative access to security devices for management and control;
SNMP device inspection and control—The ability to query and control devices such as routers, switches, printers, workstations and printers to gather detailed network information without the need for a device specific resident client; and
Clear text password detection—The ability to detect, log and report the use of internal or external usernames and passwords that are not encrypted (clear text).

Monitor modules such as those described above each perform a different monitoring and/or security function and are usually provided as a separate and distinct application (or device, depending on the implementation) on the computing system. Because computing system administrators wish to select and employ only those monitor modules deemed necessary, most monitor modules are designed to be standalone modules that function independently of the existence of other monitor modules. Therefore, each monitor module independently generates and tracks various data as necessary to perform its function, regardless of whether the same data is being tracked or generated by other monitor modules.

In addition, because the developer of a monitor module cannot rely on the existence of other monitor modules or even a common data format for data generated by other data systems, most monitor modules are not designed to interface with other monitor modules or even provide data in a format useful to other monitor modules. Therefore, monitor modules are not capable of taking advantage of information known to other monitor modules or reacting to actions being performed by other monitor modules.

For example, an anti-virus filter might include a file of known viruses that it uses when screening message traffic received by the computing system. Any messages containing files that include a virus identified in the known virus file is deleted, quarantined, or otherwise acted on by the virus filter without input from, or knowledge of, the other monitor modules. Similarly, an anti-spam filter may include a list of words or other information that it uses to screen out messages received by an e-mail application. These monitor modules may report data to an administrator of the computing system indicating that viruses or spam have been detected or that actions have been taken, but the other monitor modules on the computing system are unaware of and make their own decisions independent of any such knowledge or actions. It is left to the administrator to determine from the data if another monitor module needs to be provided with this new data to more effectively perform its function.

Each disparate monitor module has its own requirements for evaluating messages received from the communication network. In the case of an anti-virus filter, the entire message is typically received before the filter makes its analysis. The same is true for the anti-spam filter. A firewall, on the other hand, can delete the packets that make up a communication as the packets arrive, preventing them from ever being passed into the computing system proper. However, the firewall has no way of predicting that a given message or communication contains a virus, is spam, is an attempt to take over the computer, or represents some other threat, so such threats are passed into the computer to be screened by the other monitor modules.

Because the monitor modules do not share information, the fact that threats are identified by one monitor module, does not benefit any of the other monitor modules. Take, for example, a situation where a remote computer is attempting to take control of a computing system. The first effort may be to infect the computing system with one of a number of viruses that allow remote control of the computing system, by sending virus-laden messages to the computing system. If the virus software catches all of the viruses, then an attempt may be made to log into the computing system as a user. If the clear text password detection system foils this attempt, an attempt may then be made to reconfigure the computing system to allow public access to restricted material, thereby testing the HIDS system. This scenario shows that if the remote computer keeps looking for weaknesses long enough, it is likely something will be found. As the monitor modules do not interface with each other, the password detection system does not have the benefit of the knowledge that there have already been repeated infection attempts from the remote computer. Similarly, the HIDS system does not know that the remote computer was the source numerous, different, and concerted attempts to take over control of the computer.

The monitor modules often report data related to identified threats and the actions taken in response to an administrator. However, it is up to the administrator to read the disparate reports and notifications and attempt to identify trends indicative of a more significant threat to the computing system. In the scenario described above it is left to the administrator to view the data from each of the monitor modules, correlate the data, determine an appropriate coordinated response by the computing system, and implement the response. Depending on the level of communications traffic and size of the computing systems, this may involve the analysis of huge amounts of data stored in multiple data logs, each in different formats and containing different types of information. The administrator may have difficulties correlating data from one monitor module to data from another monitor module, not to mention difficulties in identifying trends in the collected data.

The scenario described above used a relatively simple example where all the attacks are coming from one remote computer. Other scenarios are possible where the attacks have other, but less obvious, common characteristics such as they all have the same destination, subject line or some other attribute. Such information may not even be tracked by each monitor module and may only be determinable upon review of a collected and correlated set of data from all the monitor modules.

Administrators have a further challenge in that most attacks occur quickly. Often, by the time the administrator has determined from the data provided by the various monitor modules that a concerted attack on multiple fronts is occurring, it has either succeeded or failed. Administrators cannot analyze the data provided in time necessary to provide effective feedback to the various monitor modules.

In reality, even though a plethora of threat data exists and is being reported in real time, it is typically used after the fact to determine what occurred after a successful attack.

SUMMARY

The present invention includes an integrated monitoring system monitoring communications received from an external communication network. The integrated monitoring system may be implemented on one or more computing systems that handle incoming and outgoing communications between the external communications network and a protected computing network (the "protected network") having at least one computing device.

The integrated monitoring system receives communications from the communications network, such as the Internet, a telephone system, a wireless network, or any combination of communications networks, screens the communications for threats, and transmits safe communications to the appropriate destination within the protected network it serves while deleting communications that represent potential threats to the protected system.

The integrated security system includes a plurality of monitoring modules for screening a plurality of different types of communications, such as e-mail messages, VPN communications, and web page traffic. Based on event data generated by the monitoring modules upon determination of a potential threat, new rules are automatically developed by the integrated security system and implemented using one or more of the monitoring modules.

In accordance with other aspects, the present invention relates to a method of automatically generating rules for use by a monitoring module. The method includes analyzing a data packet received from a communication network by the monitoring module using a predetermined set of rules. The data packet includes information identifying the packet's source (e.g., a source IP address) and the packet's destination. In response to the packet failing the analyzing operation, the method searches an event database for events associated with the source of the packet. If the event database contains an event record associated with the source of the packet, a new rule is generated to block subsequent packets from the source of the packet for a predetermined period of time. The new rule is then added to the set of rules used by the monitoring module.

DETAILED DESCRIPTION

Figure 1:
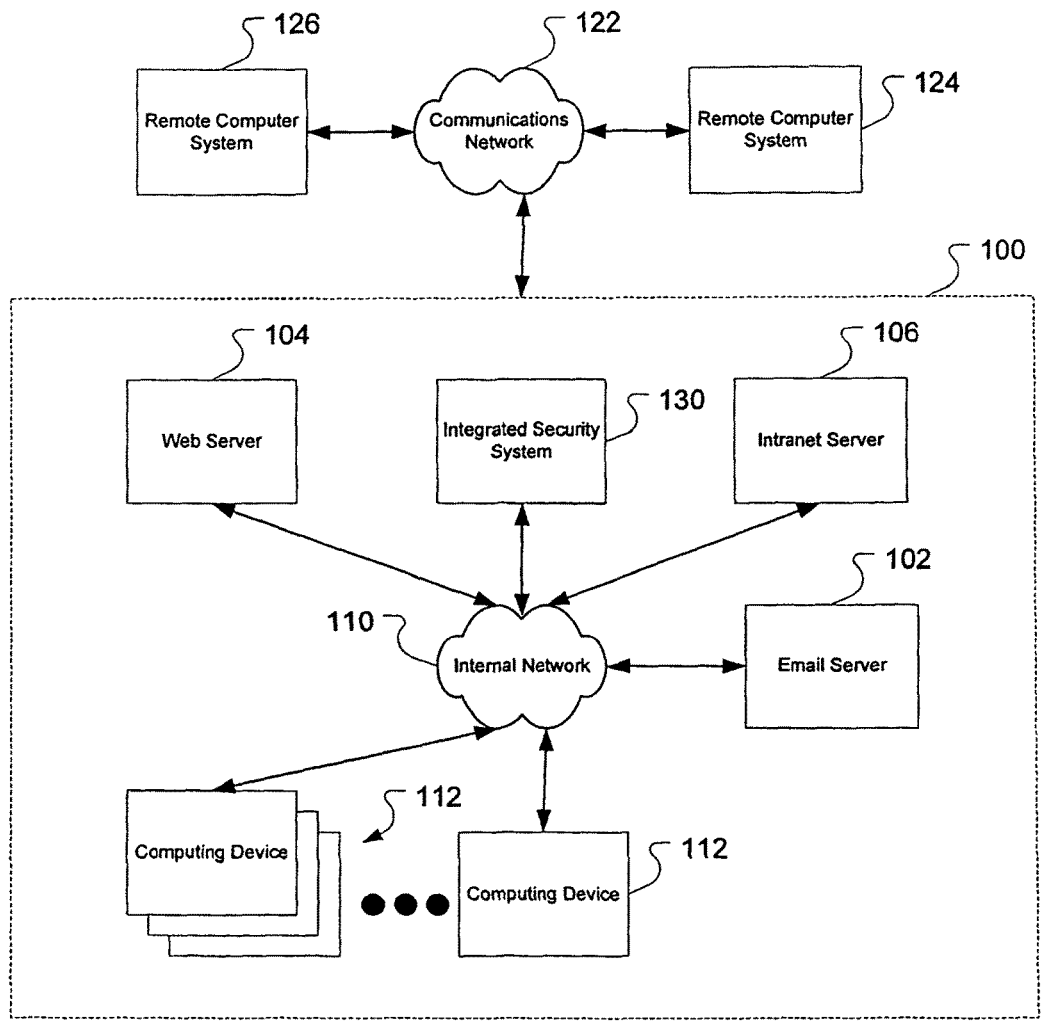
FIG. 1 illustrates an integrated monitoring system in accordance with an embodiment of the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In one possible embodiment, a computing system may include a single computing device or multiple, connected computing devices. Computing devices are electronic devices that perform functions using a combination of hardware and/or software. Computing devices may include such hardware as a processor, computer readable storage media (including, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the system), and one or more communication devices suitable for transmitting and receiving data over communication media. In addition, computing devices may also include software, firmware or a combination of the two stored on the computer readable media. Examples of computing devices include personal computers, handheld computing devices, mobile communication devices, cellular telephones, networked appliances, computer servers, and mainframes and any other programmable device that is exposed to and receives data traffic.

Communication media includes any medium capable of carrying data or information such as computer-readable instructions, data structures, and program modules, whether such data is embodied in a modulated data signal such as a carrier wave or other transport mechanism. By way of example, and not limitation, communication media includes wired media such as a wired network or direct-wired connection, and wireless media such as acoustic, RF, infrared, and other wireless media.

Computing devices may be implemented using different software operating systems and programming languages. Examples of operating systems include Microsoft Windows XP, Macintosh OS X, OS2, Unix- and Linux-based operating systems, and Microsoft Windows CE. Examples of programming languages suitable for developing software embodiments include C, C++, Java, Visual Basic, Perl, and markup languages such as XML, HTML, and XAML. Selection of operating systems and software languages is often more an issue of user and developer preferences or convenience.

Computing devices may be described in terms of the logical operations performed by the devices. The logical operations of the following various embodiments are implemented (1) as a sequence of computer implemented acts running on a computing system and/or (2) as interconnected machine logic circuits or circuit modules within the computing system. The implementation is a matter of choice dependent on the performance requirements of the computing system implementing the invention. Accordingly, the logical operations making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

FIG. 1 illustrates an exemplary computing system 100 that implements an embodiment of an integrated monitoring system 120. The exemplary computing system 100 as shown includes an email server 102, a web server 104 and an intranet server 106. The servers are further connected to an internal communication network 108, such as an intranet. The internal communications network 108 connects the various computing devices and components internal to the computing system 100. In the embodiment shown, the internal network 108 is connected to the servers 102, 104, 106 and a plurality of additional computing devices 112. The computing system 100 is further connected to other remote computing systems 124, 126 via an external communications network 122. The external communications network 122 may be the Internet or may be some other wired or wireless communications network.

In the environment shown in FIG. 1, communications traffic in the form of data transmitted on the network 122 may pass between the computing system 100 and the remote computing systems. In addition, there also may be communication traffic passing between various elements within the computing system 100. The communications traffic on the network 122 and within the computing system 100 will be discussed as consisting of a plurality of separate and identifiable "messages". Examples of messages on the Internet include, for example, digital files, email messages, web pages, voice over internet protocol (VOIP) data streams, and streaming audiovisual data. Messages are transmitted in digital form as one or more packets of digital data.

The embodiment in FIG. 1 also includes an integrated monitoring system 130, which monitors communication data traffic. The integrated monitoring systems 130 may be implemented to monitor data traffic on the internal network 110, data traffic received from the external network 122, or both depending on the implementation. The integrated monitoring system 130 analyzes the communication traffic in order to identify messages that may pose a threat to the computing system and block or quarantine any such messages identified. Such threats include any unwanted or undesirable occurrence related to data traffic such as, for example, spam, viruses, denial of service attacks, unauthorized attempts to infiltrate the computing system, etc. While some threats may be actual threats of harm or damage to the system, others may simply be inconvenient, annoying or unwanted events and not pose any risk of damage to the computing system. The integrated monitoring system 130 will be discussed in greater detail with reference to FIG. 2 below.

FIG. 1 shows the integrated monitoring system 130 connected to the internal network 110. However, it should be noted that the integrated monitoring system 130 may be connected to the internal and external networks in many different ways and still perform its security functions. For example, in one embodiment the integrated monitoring system 130 is implemented as a gateway between the external communication network 122 and the internal communication network 110. Messages destined for the computing system 100 are screened by the integrated monitoring system 130 before being passed on to the internal network 110. In an alternative embodiment, all messages carried on the internal network, regardless of whether they originate from a computing device 112, a server 102, 104, 106 or the external network 122, pass through the integrated monitoring system 130.

Figure 2:
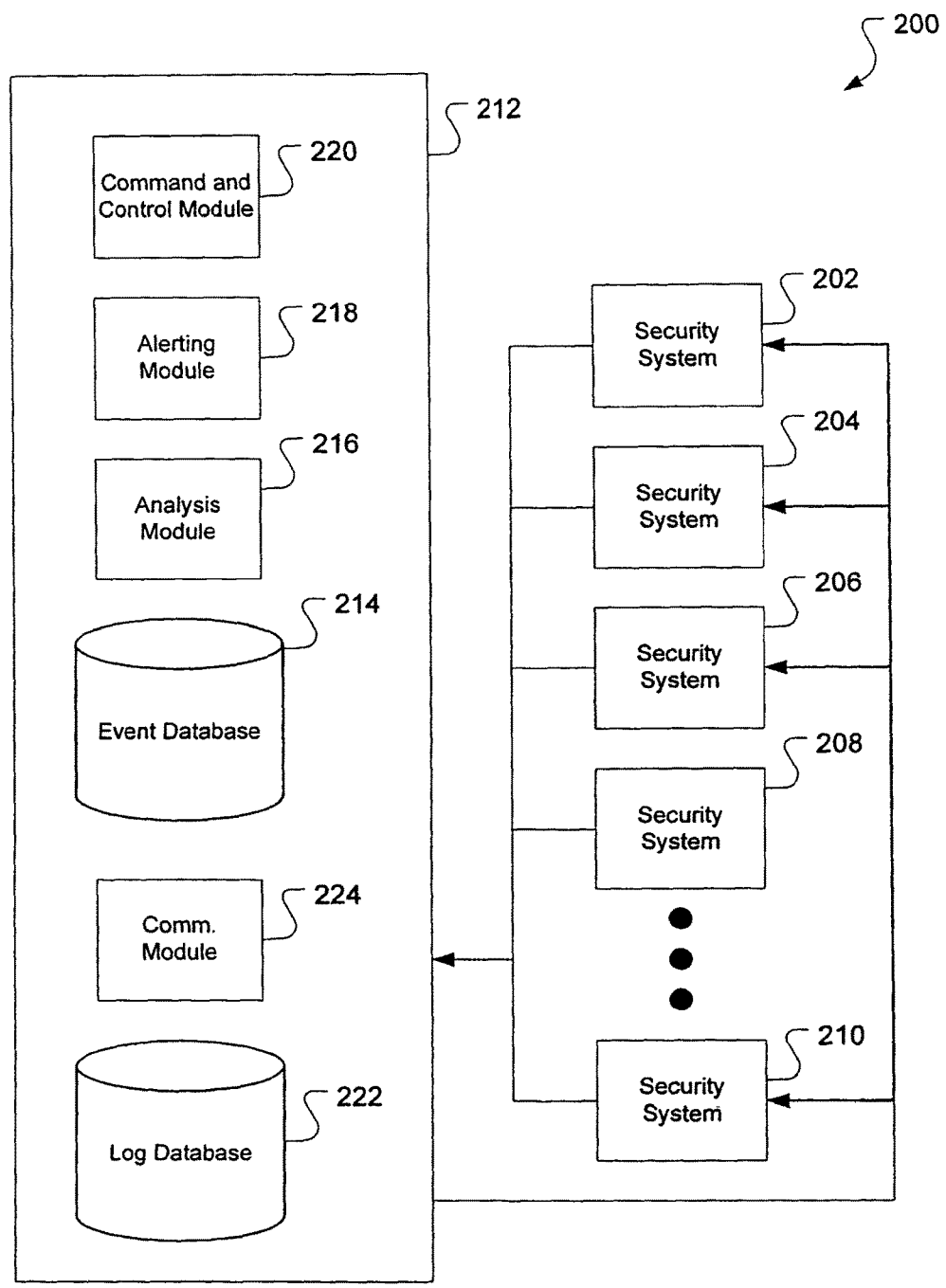
FIG. 2 illustrates some of the functional components of an embodiment of an integrated monitoring system for a computing system.

FIG. 2 illustrates the functional components of an embodiment of an integrated monitoring system 200 for a computing system. The integrated monitoring system 200 includes multiple monitor modules 202, 204, 206, 208, 210, and a security system integrator (SSI) 212. The SSI receives data reported from the monitor modules and may issue commands to at least some of the monitor modules. Embodiments of the SSI 212 may include such components as an analysis module 216 that analyzes the contents of an event database 214, an alerting module 218 that transmits security alerts (such as to system administrators and users), a command and control module 220 that provides an interface between the SSI 212 and the monitor modules 202, 204, 206, 208, 210, a communication module 224 that supports the reporting of the contents of the event database 214 to other locations, and a log database 222 that stores a log record of actions taken by the integrated monitoring system 200 over time. Each of these components is discussed in greater detail below.

The integrated monitoring system 200 includes a plurality of monitor modules 202, 204, 206, 208, 210. Each monitor module 202 may independently perform one or more different monitoring and security functions. The functions of some monitor modules also may overlap. In general, the monitor modules monitor and evaluate communications traffic on a communication network (internal, external or both depending on how the integrated monitoring system 200 is implemented within the computing system). Each of the monitor modules 202, 204, 206, 208, 210 are connected to the communication network of the computing system as necessary to perform their given function. Examples of monitor modules include firewalls for connection monitoring, dynamic host configuration protocol (DHCP) modules for extracting IP information from the network, intrusion detection systems (IDSs) monitor data traffic and detect attacks, intrusion detection and prevention (IDP) systems that detect and attempt to block attacks, host-based intrusion detection systems (HIDS), proxy and cache servers, forwarders, anti-spam filters, content filters, and virus filters, honey pots, and password protection modules.

The monitor modules monitor the communications traffic to identify messages that may pose a security threat to the computing system. Each monitor module may evaluate the communication traffic in a different way in an attempt to identify different potential threats. Upon identification of a potentially threatening message by an monitor module, the monitor module may take unilateral action to address the threat. In addition to any such unilateral action, the monitor modules also report event data related to the events that are identified.

Each message identified as a potential security threat by one or more of the monitor modules is a single "event." That is, if a message is identified by several different monitor modules, possibly for different reasons, as a potential threat, that message will be considered a single event, as described in greater detail below.

Each monitor modules 202, 204, 206, 208, 210 is that they provide data related to the communications traffic on the network. For identified events monitor modules may generate and report data describing or otherwise related to the event. This data, referred to as event data, may be the only indication that the monitor module has identified a potential threat.

The event data reported, of course, are dictated by the implementation of the reporting monitor module. Such event data may include, for example, data identifying the monitor module generating the event data, the event type, a priority associated with the event determined by the monitor module, a timestamp for the event, and one or more identifying details of the message that is the source of the event, such as the source IP address, port, URL or MAC of the message, an identifier indicating if the source is internal to the computing system, the destination IP address, port, URL or MAC of the message, an identifier indicating if the destination is internal to the computing system, and information concerning whether the message is coming from a known "bad" or "good" host. The event data may be provided as a simple ASCII file with a known format, as XML that include data type definitions, in an HTML file, or in any other form, as long it is known to and useable by the SSI.

For example, a stateful firewall monitor module that remembers the context of connections and continuously updates this state information in dynamic connection tables, may use one or more IP tables to identify known sources of threats and automatically block traffic from those IP addresses in the IP tables. In the event that messages from IP addresses in the IP tables are identified and blocked by the firewall, the firewall may report event data to the SSI including the source IP address, the destination IP address, identifying information regarding the content of the message, and the date and time the message was received by the firewall.

Another monitor module may be an IDP system. The IDP may include an internal set of rules for use in evaluating and blocking messages in real time. Upon detection of a threat, the IDP system may report an alert, a threat ID and description, a timestamp, and the source and destination IP addresses of the message. Additional event data may also be reported depending on the implementation.

In the embodiment, the monitor modules 202, 204, 206, 208, 210 report event data to a monitor module integrator (SSI) 212. The event data is received by the SSI 212 and stored in an event database 214. In one embodiment, the SSI 212 maintains the event database 214 so that all event data received from the monitor modules 202, 204, 206, 208, 210 relating to a specific event (i.e. a single message) is collected and stored within a single event record in the event database. In an alternative embodiment, a new event record is created for each item of event data received. In order to prevent the database from getting too big, the event database 214 may purge event data that reach a specified age or may store data until some predetermined database size is reached.

The event database may be structured in various ways. In one embodiment, a single Event Log Table is maintained.

The Event Log Table is the primary repository of the event data. As described above, the event data provided by the monitor modules is stored in event records in the Event Log Table. In addition, various other data generated by the SSI 212 related to the event may also be included in an event record. For example, the SSI may generate unique identifiers for each event record to support future error detection or transmission operations.

| Event Data Type | Description |
| --- | --- |
| Event Priority Description | Description of the event priority, such as "CRITICAL EVENT". |
| Log Source Description | Description of the source of the event, such as "FIREWALL". |
| Event Type Description | The type of event, such as a virus contained in an attachment. |
| Event Description | Description of the event, such as for a virus event type the name of the virus identified. |
| Event Date and Time | A time stamp related to the event, such as when the message was received by the computing system. |
| Source IP | The IP address that the event identifies as its origination point. |
| Event Protocol | Common network communications protocol such as TCP, UDP, ICMP, etc |
| Source Port | The IP port that a transmission originated from, e.g.: HTTP data generally originates from port 80 |
| Source URL | The uniform resource locator (URL) address that the event identifies as its origination point. |
| Source MAC | This is the Media Access Control address for network devices (a.k.a. nodes). This is a standard unique "ID" for each physical port of network devices such as computer network interface cards, network switching equipment, etc. The Source MAC refers to the ID of the communication packet source device. |
| Internal Source | Data indicating if the origination point of the event is internal to the computing system 200. |
| Blocked Source | Data indicating if the origination point of the event is blocked by an existing IDS rule in the computing system 200. |
| Blocked Destination | Data identifying a destination within the protected network that is blocked by the administrator from receiving communications. |
| Destination IP | The IP address that the event identifies as its destination. |
| Destination URL | The uniform resource locator (URL) address that the event identifies as its destination |
| Destination Port | The target IP port for a transmission, e.g.: HTTP data is generally received by port 80. |
| Destination MAC | This is the Media Access Control address for network devices (a.k.a. nodes). This is a standard unique "ID" for each physical port of network devices such as computer network interface cards, network switching equipment, etc. The Destination MAC refers to the ID of the communication packet recipient device. |
| Internal Destination | Data indicating if the destination point of the event is internal to the computing system 200. |
| Auto Bad Host | Data indicating the corresponding source has been manually entered as a bad host, and should therefore be blocked without further analysis (the "Auto" refers to how the default value of this column is set when not specified). |
| Auto Good Host | Data indicating the corresponding source has been manually entered as a good host, and should therefore be allowed without further analysis (the "Auto" refers to how the default value of this column is set when not specified). |

The SSI 212 includes an analysis module 216. The analysis module 216 analyzes the event data in the event database 214 to identify trends and anomalies in the event data. The analysis module may use various statistical analysis techniques to determine if an event poses a greater threat than that identified by the monitor modules reporting the event data. The analysis module also determines if an event potentially poses a type of threat that the monitor modules are not designed to identify. Upon each receipt of new event data, the analysis module 216 reanalyzes the contents of the event database to determine if the new event data changes the results of its previous analysis.

One example of an analysis performed by the analysis module 216 is a Bayes' Theorem, or Bayesian, analysis. A Bayesian analysis is a statistical procedure that estimates parameters of an underlying distribution based on an observed distribution. Beginning with a prior distribution, which may be based on anything including an assessment of the relative likelihoods of parameters or the results of non-Bayesian observations, event data is collected and an observed distribution is created. Then a calculation may be made to estimate the likelihood of the observed distribution as a function of parameter values. By multiplying this likelihood function by the prior distribution, a unit probability over all possible values is obtained. This is called the posterior distribution. The mode of the distribution is then the parameter estimate, and probability intervals (the Bayesian analog of confidence intervals) can be calculated using the standard procedure. In embodiments, the Bayesian analysis may be performed on any of the event data provided by monitor modules, such as source IP addresses, to determine a likelihood that messages from a source IP address are threats. The Bayes' Theorem analysis is discussed in greater detail in the related U.S. application Ser. No. 10/768,931, entitled INTEGRATED DATA TRAFFIC MONITORING SYSTEM, filed Jan. 29, 2004, which is incorporated by reference.

Additional analyses performed by the analysis module 216 may be designed to identify anomalies and trends in the event records. To do this, the contents of the event database are scanned and events with common data are identified. For example, the analysis will identify event records from common monitoring modules or with common data source/destinations. In addition, the scanning may also seek to identify known trends indicative of known threats. Events identified with common elements or other known issues are then weighted based on a predetermined weighting algorithm that takes into account the type, priority, monitor module and specifics of the event. The weighting algorithm produces a sum weight for these common events indicating a base severity of the threat (i.e. a threat level). The analysis module 216 then identifies what actions, if any, should be performed based on the calculated threat level. Upon completion of an analysis by the analysis module 216, the results of the analysis may be that the event, and possibly any future messages having specific attributes (for example a point of origination, a destination or specific text in a subject line), should be treated differently by the integrated monitoring system 200 than they are currently being treated. For example, the analysis may determined that every email coming from a certain IP address is likely to be classified as an event by one or more monitor modules and should be screened by the firewall prior to entering the computing system for analysis by the other monitor modules. In these cases, the analysis module 216 may issue commands to other components in the SSI 212. These commands may subsequently be passed, for example by the command and control module 220 as described below, to any connected external component, monitor module or computing system.

In general, the commands allow the SSI 212 to control the operation of any of the other components, modules and devices of the integrated monitoring system 200. The commands issued by the SSI 212 may be as simple as a command to the firewall to add a certain IP address to one or more of its IP tables of IP addresses to block. Other examples of commands include commands to one or more monitor modules that create a new rule to use when evaluating network traffic, commands directing that messages with specific content be allowed to pass, be blocked or be quarantined, commands, such as to a HIDS module, to expand the list of external systems and logs that are evaluated, commands to automatically delete future messages sent to a specified computer port for a specified period of time, and commands changing the threat level assigned by monitor modules to different events. Commands may be issued to the alerting module 218 to generate alerts.

The SSI 212 also includes an alerting module 218. An analysis by the analysis module 216 may determine that a system administrator, various system users, or other designated parties should be alerted to events identified by the SSI 212. In these cases the alerting module 218 identifies the parties that should be alerted and generates the alert messages with the appropriate data from the event database 214.

The SSI 212 also includes a command and control module 220. The command and control module 220 acts as an interface between the various modules within the SSI 212 and the monitor modules 202, 204, 206, 208, 210. The command and control module 220 stores information concerning how to interface with each monitor module. Using this information, the command and control module can receive a notification, such as from the analysis module 216 for example, that an action by a specific monitor module is required and generate a command for the specific monitor module that carries out the action. Because the command and control module 220 allows the SSI 212 to issue commands to any of the monitor modules capable of receiving commands, an administrator may use the SSI 212 as a central control point for the integrated monitoring system 200.

The SSI 212 is also provided with a communication module 224. The communication module 224 supports the communication between the various other components of the SSI 212 and components and systems external to the SSI 212. In some embodiments, the communication module 224 periodically transmits any new event data received by the event database 214 to a remote computing system or external device for storage or further analysis.

A log database 222 is maintained by the SSI 212 to track actions taken by the SSI 212. The log database 222 may also store log entries recording commands received by the SSI 212 (such as from the administrator) and directed at one or more monitor modules. Other activities may be logged as well depending on the preferences of the system administrator.

Figure 3:
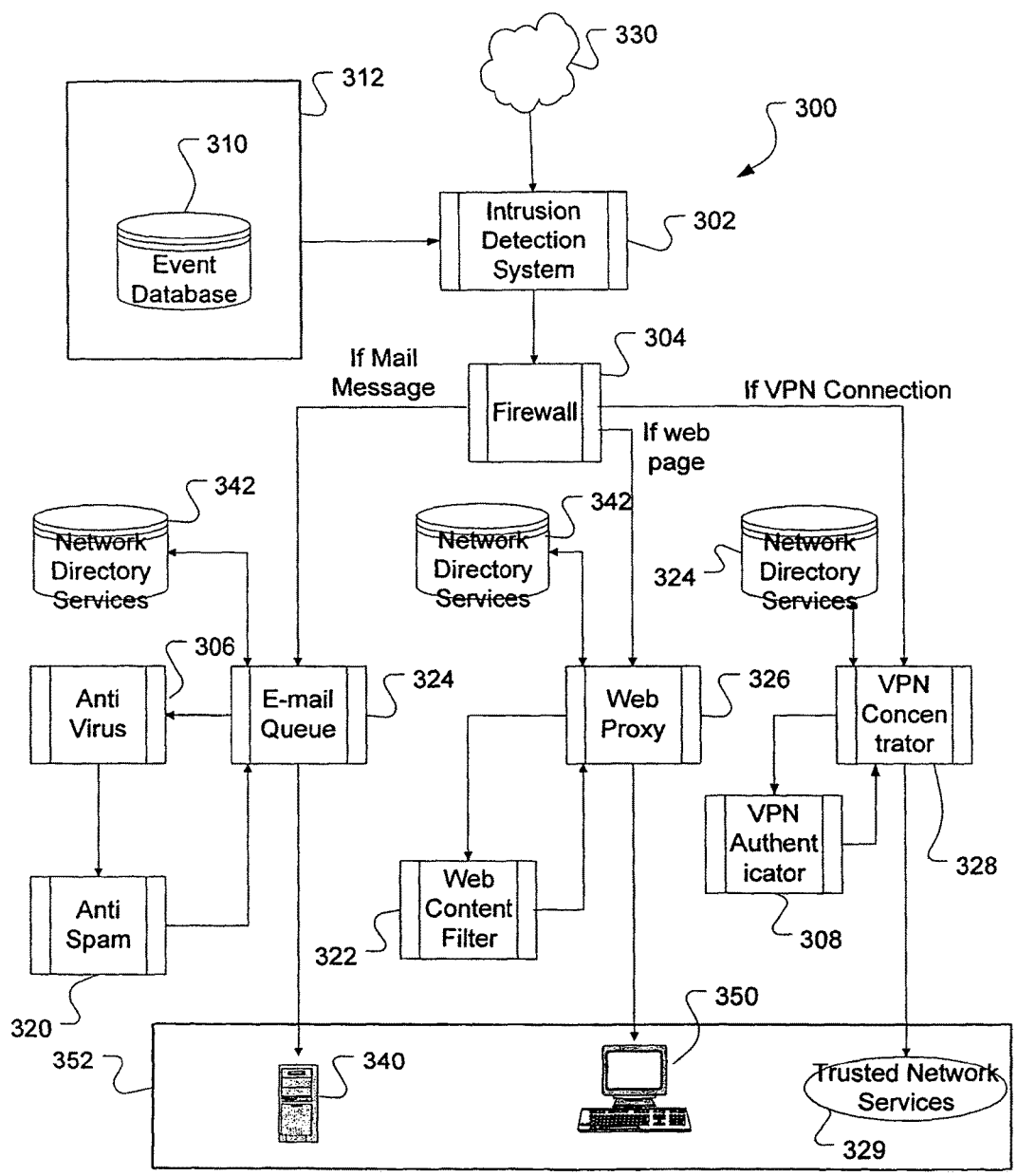
FIG. 3 illustrates a detailed embodiment of an exemplary implementation of an integrated monitoring system.

FIG. 3 illustrates a computing system 300 that includes an embodiment of an integrated monitoring system. The computing system 300 is a communications system that handles incoming and outgoing communications between an external communications network 330 and a protected computing network 352 (hereinafter the "protected network") having at least one computing device 350. In a protected network 352 that consists of a single computing device 350, the computer system 300 may be implemented as a software program executing on the computing device 350 or may be implemented as a separate and distinct computing device through which all incoming communications to the eternal network 330 pass. In an embodiment in which the computing system 300 serves a protected network 352 having a plurality of computing devices 350, the computing system 300 may be implemented on one or more separate computing devices, such as a router or communication-dedicated computing device, depending on the flow rate of communication traffic that must be handled.

The computing system 300 receives communications from a communications network 330, such as the Internet, a telephone system, a wireless network, or any combination of communications networks, and transmits the communications to the appropriate destination within the protected network 352 it serves. The destination may be a specific software program executing on a computing device 350 within the network or a software program operating on the computing system 300.

The computing system 300 shown is capable of receiving a plurality of different types of communications. The computing system 300 can receive electronic mail messages (e-mail) and pass them on to a mail server 340 that is responsible for distributing e-mail to various user mailboxes. The computing system 300 also may receive web pages generated in response to user requests from browsers executing on computing devices 350. The computing system 300 is further capable of receiving VPN communications and passes those to the VPN system. In the embodiment shown, a firewall 304 is used to direct the different types of packets (i.e., e-mail packets, web page packets, and VPN packets) to the appropriate destination.

The communications are received by the computing system 300 in the form of digital packets. A packet may constitute a complete communication or may need to be combined at the destination with other packets to create a complete communication, such as an email message or web page. Each packet includes various packet identification information such as the source of the packet (usually an IP address), the destination of the packet, authentication information, and other information in addition to the payload of data that contains the actual message of the communication.

The computing system 300 includes an integrated monitoring system that screens the packets as they are received and can automatically block packets from sources that the integrated monitoring system determines from the screening to be likely sources of potential threats to the computer network. The integrated monitoring system includes an SSI 312, including an event database 310 as described with reference to FIG. 2, and a plurality of monitor modules. In the embodiment shown, there are four monitor modules that provide event data to the SSI 312: an IDS module 302, the firewall 304, a virus detection module 306, and a VPN authentication module 308. The embodiment shown also includes additional monitor modules that may or may not provide event data to the SSI 312: a spam detection module 320; and a web content module 322.

The IDS module 302 screens all incoming communications. The IDS module 302 uses a set of rules, referred to as intrusion detection (ID) rules to screen each packet as it is received from the communications network. The IDS module 302 maintains the ID rules in a database or in one or files (not shown) and is capable of deleting rules and receiving new or changed rules as directed by a system administrator or by the SSI 312. Upon receipt of a packet from the communication network 330, the IDS compares the information in the packet with the current ID screening and blocking rules and either deletes the packet or passes it on to the firewall as will be described in greater detail with reference to FIG. 5. In addition, whenever the IDS module 302 deletes a packet (i.e., a packet fails one of the ID rules), the IDS module 302 generates event data, which are transmitted to the event data database 310.

In the embodiment shown, the IDS module also implements the blocking of incoming communications based on the source of the communications. Thus, the IDS module can be considered, and indeed is often implemented, as two modules: a screening or monitoring module and a blocking module. For the balance of this specification, no differentiation will be made between the two modules within the IDS module 302. However, one skilled in the art will understand that the IDS module 302 could be similarly implemented as two independent modules. Furthermore, the term IDS rules in this specification refers generally to rules that block incoming packets based on their source as these rules, in this embodiment, would be implemented by the blocking component of the IDS. As such, IDS rules are distinct from the screening criteria used by the IDS module, as well as the other modules' screening criteria in this embodiment.

The firewall 304, as mentioned above, is responsibly for separating packets by type and passing them to their appropriate destinations. In addition, the firewall 304 also performs a screening of the packets using its own set of firewall rules as will be discussed in greater detail with reference to FIG. 7. In addition, whenever the firewall 304 deletes a packet (i.e., a packet fails one of the ID rules), the IDS module 302 generates event data which it transmits to the event data database 310.

Packets identified as e-mail packets are passed by the firewall 304 to an e-mail queue 324. While in the e-mail queue 324, the virus detection module 306 and spam detection module 320 screen the e-mail packets for viruses and spam respectively. Such screening may require receiving all the packets that make up a specific communication, before the screening may be performed. The screening criteria for the modules 306 and 320 are usually kept in one or more databases or files that are maintained by the computing system administrator. Packets that pass the screening are transmitted to the appropriate destination, such as the computer network mail server as shown. Packets or complete communications that fail the screening may be partially or completely deleted, quarantined, identified to the recipient depending on how the modules are directed to handle such failures. In addition, in the monitoring system shown the virus detection module 306 generates event data for each packet or complete communication that fails the virus screening. This event data is transmitted to the event database in the SSI 312.

Packets identified as web page packets are passed by the firewall 304 to a web proxy 326. The web proxy 326 stores the web page packets so that a web content filter 328 may screen the web pages for inappropriate content based on web content rules provided by the administrator or end user. Such screening may require receiving all the packets that make up a web page, before the screening may be performed. Alternatively, some screening may be performed on individual packets as they arrive, while other screening is performed after receipt of the complete web page element. The web content rules may be stored in a separate file or database and maintained by the administrator. If a web page passes the screening, the web page is transmitted to its destination computing device 350. If a web page fails the screening, it may be deleted and a substitute page may be sent in its stead.

Packets identified as VPN connection packets are passed by the firewall 304 to a VPN concentrator 328. The VPN concentrator 328 determines whether to grant or reject access to the VPN 329. A VPN authentication module 308 is provided to authenticate VPN connection packets. The authentication process is described in greater detail below with reference to FIG. 10. The VPN authentication module 308, or in an alternative embodiment the VPN concentrator 328, generates event data for packets or VPN connection communications that cannot be authenticated. The event data is transmitted to the SSI 312 for analysis and storage in the event database 310.

The computing system 300 includes a network directory service 342 that is used to authenticate destinations and users known to the system. A different network directory service 342 may be provided for each type of destination and packet or a single integrated network directory service 342 may be used.

The computing system 300 may be part of a multi-system implementation as described in co-pending U.S. application Ser. No. 10/768,931, filed Jan. 29, 2004. In the multi-system implementation, the computing system 300 is in communication with a remote computing system (not shown), either via the communications network 330 or a dedicated connection (not shown), that maintains a security system master integrated (SSMI) as described in the co-pending application. The computing system 300 transmits some or all of the event data stored in the event database 310 to the SSMI for analysis. The SSMI, which also collects event data from other computing systems at other sites, analyzes the collected set of event data. The SSMI may perform the some or all of the analyses described below with reference to the SSI 312 and may perform additional analyses on the collected multi-system event data and generate and return rules to the SSI 312 for implementation by the computing system 300.

Figure 4:
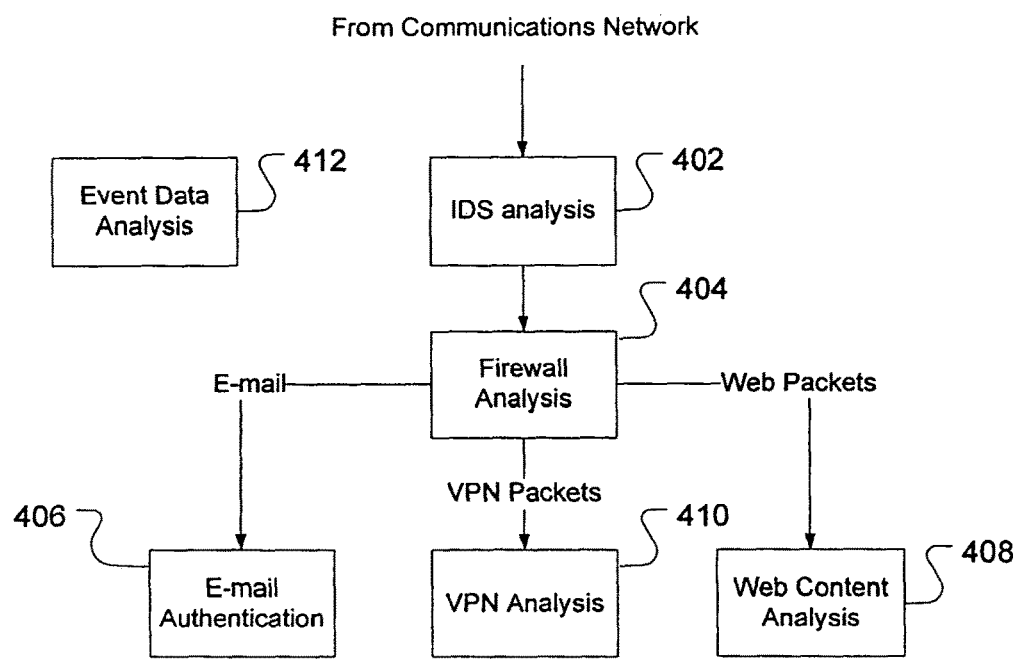
FIG. 4 shows, at a high level, an embodiment of the logical operations of the integrated monitoring system of FIG. 3.

Turning now the operation of the computing system 300, FIG. 4 illustrates the main logical operations of the integrated monitoring system of FIG. 3 performed before a communication packet is transferred into the protected network 352. The first operation performed on communication packets received by the monitoring system is an IDS analysis operation 402, which is discussed in greater detail with reference to FIG. 5. The IDS blocking analysis may result in blocking the incoming packet or transferring it to the firewall. In addition, the IDS screening analysis may or may not result in the generation of event data.

If a communication packet passes the IDS analysis operation 402, a firewall analysis operation 404 is performed on the communication packet. The firewall analysis operation 404 is discussed with greater detail with reference to FIG. 6.

A communications packet that passes the firewall analysis operation 404 is then transferred to an appropriate analysis based on the type of the communication packet (i.e., e-mail, VPN, or web page packets). E-mail packets are transferred to an e-mail analysis operation 406, which is discussed in greater detail with reference to FIG. 7. Web page packets are transferred to a web content analysis operation 408, which is discussed in greater detail with reference to FIG. 8. VPN packets are transferred to a VPN analysis operation 410, which is discussed in greater detail with reference to FIG. 9.

A packet that passes its appropriate analysis based on its type is then allowed to enter the protected network 352 for delivery to its destination.

The analysis operations 402, 404, 406, 408, 410 described above are referred to as packet analysis operations because they analyze communication packets against some pre-determined criteria. In addition, as will be described in greater detail below, the packet analysis operations 402, 404, 406, 408, 410 also generate event data for packets that fail an analysis.

The integrated monitoring system also analyzes the event data in an event data analysis operation 412. The event data analysis operation 412 automatically generates new or revised criteria for use by one or more of the packet analysis operations based on the event data received and an event data rule set. The event data analysis operation 412 is discussed in greater detail with reference to FIG. 10.

FIGS. 5-10 describe each of the major analysis operations in FIG. 4 in greater detail. The descriptions are given with reference to the specific embodiment of the computing system 300 shown in FIG. 3 that monitors e-mail, VPN and web content communications for ease of understanding. However, one skilled in the art will recognize that the scope of the invention is not limited to that specific embodiment and that other embodiments of computing systems for monitoring any combination different types of digitized communication data are contemplated.

Figure 5:
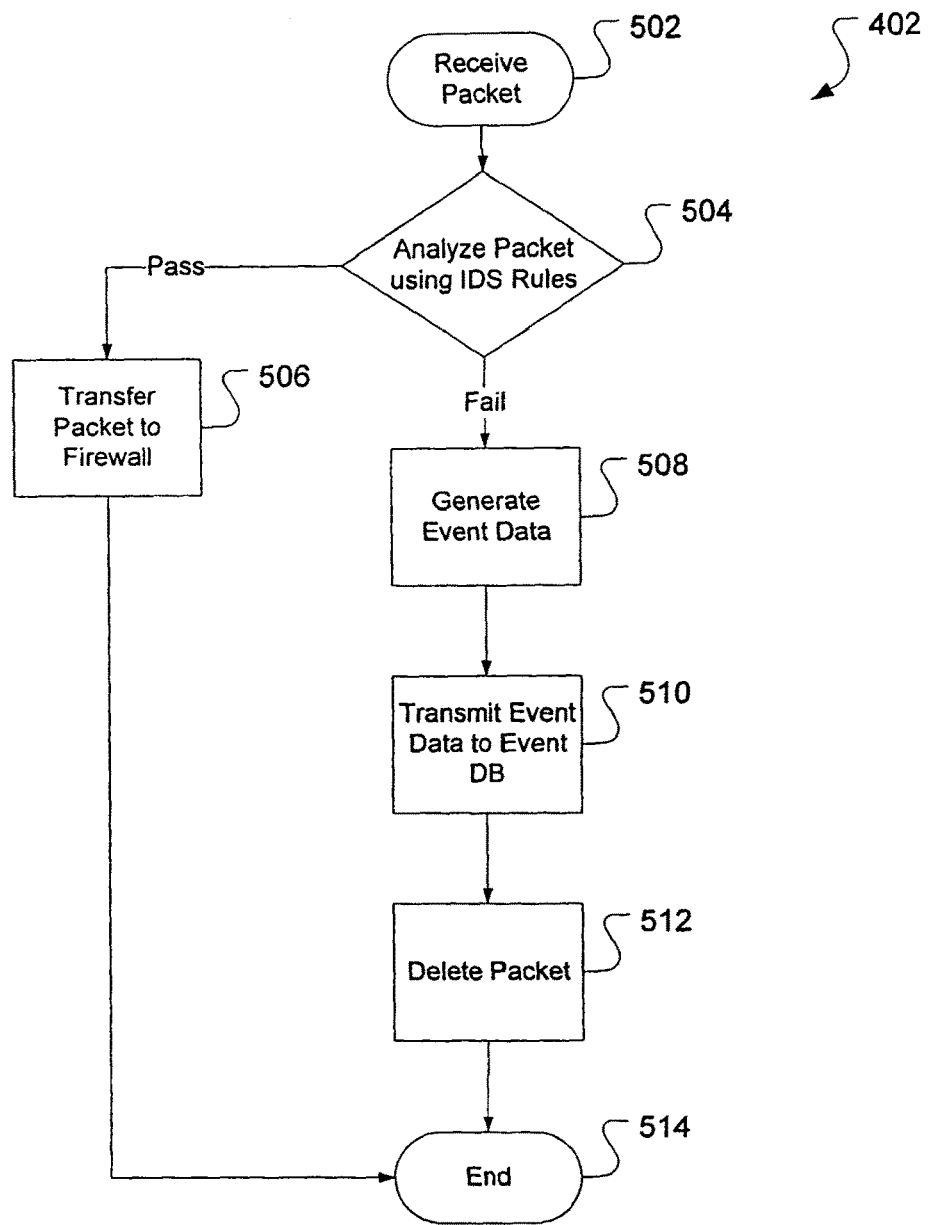
FIG. 5 illustrates an embodiment of the logical operations of the IDS analysis operation of FIG. 4.

FIG. 5 illustrates the logical operations of the IDS analysis operation 402. In an embodiment, packets are received from the communication network 330 and stored in an input buffer on the computing system 300. The IDS analysis operation 402 starts when a communication packet is read from the input buffer by the IDS module 302 in a receive packet operation 502.

A packet read from the input buffer is then analyzed in an IDS rules analysis operation 504. The IDS rules analysis operation 504 determines if there are any IDS rules that indicate that the communication packet should be barred from entering the protected network 352 based on the information available in the packet. The IDS rules analysis operation 504 includes retrieving or otherwise accessing a pre-determined set of IDS blocking and screening rules. The IDS rules may be maintained in memory in the IDS module or may be stored in a remote database and may need to be retrieved as part of the IDS rules analysis operation 504.

The IDS rules analysis operation 504 compares the information in the communication packet against the rules of the IDS rules set. This may include reading some or all of the information from the communication packet such as date and time the packet was received, the source of the packet, the destination of the packet, and the payload of the packet. Information may be read from the packet automatically or may be read in response to a specific IDS rule. IDS screening rules are generally known in the art and include rules that determine if the packet is of a known type or not, if the packet is part of a request for information from within the protected network, if the packet is part of a login request, if the packet is part of a remote procedure call, if the packet is directed at an unusual port, if the packet is an administrative access request, and if the packet is requesting access to a potentially vulnerable web application.

A communication packet "passes" the IDS rule analysis operation 504 if there are no IDS rules that indicate that the communication packet should be barred from entering the protected network 352. A communication packet that passes the IDS rule analysis is transferred to the firewall module in a transfer packet to firewall module operation 506.

However, if the set of IDS rules contains at least one rule that indicates that the communication packet should be prevented from entering the protected network, the packet "fails" the IDS rules analysis operation 504. Upon determination that a packet has failed the IDS rules analysis operation, a generate event data operation 508 is performed. The generate event data operation 508 includes collecting certain information from the failed packet. This information includes at least the source of the packet and may include some or all of the event data described in Table 1 that is directly available from the packet. The event data may also identify the IDS rule or rules that the packet failed and may identify the IDS module as the module that failed the packet.

In the embodiment shown, the generate event data operation 508 also includes assigning a priority to the failed packet. A priority is a numerical identifier that indicates the presumed relative threat of the packet to the protected network. In one embodiment, there are three priorities, or priority levels, ranging from a highest priority (priority level "1") to a lowest priority for failing packets ("3") with there being one intermediate priority ("2"). In general, a priority 1 event is a packet that, in whole or in part, is an actual attack on the protected network, a priority 2 event is an attempt to break into (intrude) the protected network, and a priority 3 event is a reconnaissance or probing of the protected network. In alternative embodiments, fewer or more priority levels may be used to differentiate different threats or perceived threats.

The priority assigned may be dictated by the IDS rule that the packet failed. If the packet fails more than one IDS rule, the packet may be assigned the highest priority regardless of the priorities that would be assigned by the failing rules. Alternatively, the packet may be assigned the highest priority directed by the failing rules (e.g., if a packet fails two rules, one that assigns failing packets as priority 3 events and one that assigns failing packets as priority 2 events, the packet is assigned a priority of 2).

Other methods of assigning a priority to a packet are also contemplated. For example, the priority assigned may be dictated the number of IDS rules that the packet failed. In another embodiment, a priority is assigned that indicates that the IDS failed the packet or indicates which IDS rule or group of IDS rules failed the packet.

After the event data is generated, an event data message is created and transmitted to the SSI 312 in a transmit event data operation 510.

Failure of a packet by the IDS rule analysis operation 504 also results in a delete packet operation 512. This operation 512 deletes the packet from the computer system 300, thereby preventing the packet from reaching its destination and freeing up resources for analysis of later received packets. In an embodiment, deleting the packet may include saving a copy of the packet to a deleted packet database for further analysis. One skilled in the art will recognize that the exact order of the operations described above with respect to the IDS analysis may be varied and that the delete packet operation 512 could be performed before the transmit event data operation 510.

Upon completion of the above-described IDS analysis operations, the IDS analysis operational flow ends in an end operation 514 and the IDS module either reads the next packet from the input buffer or goes into a standby mode waiting for the next communication packet to be received by the buffer.

Figure 6:
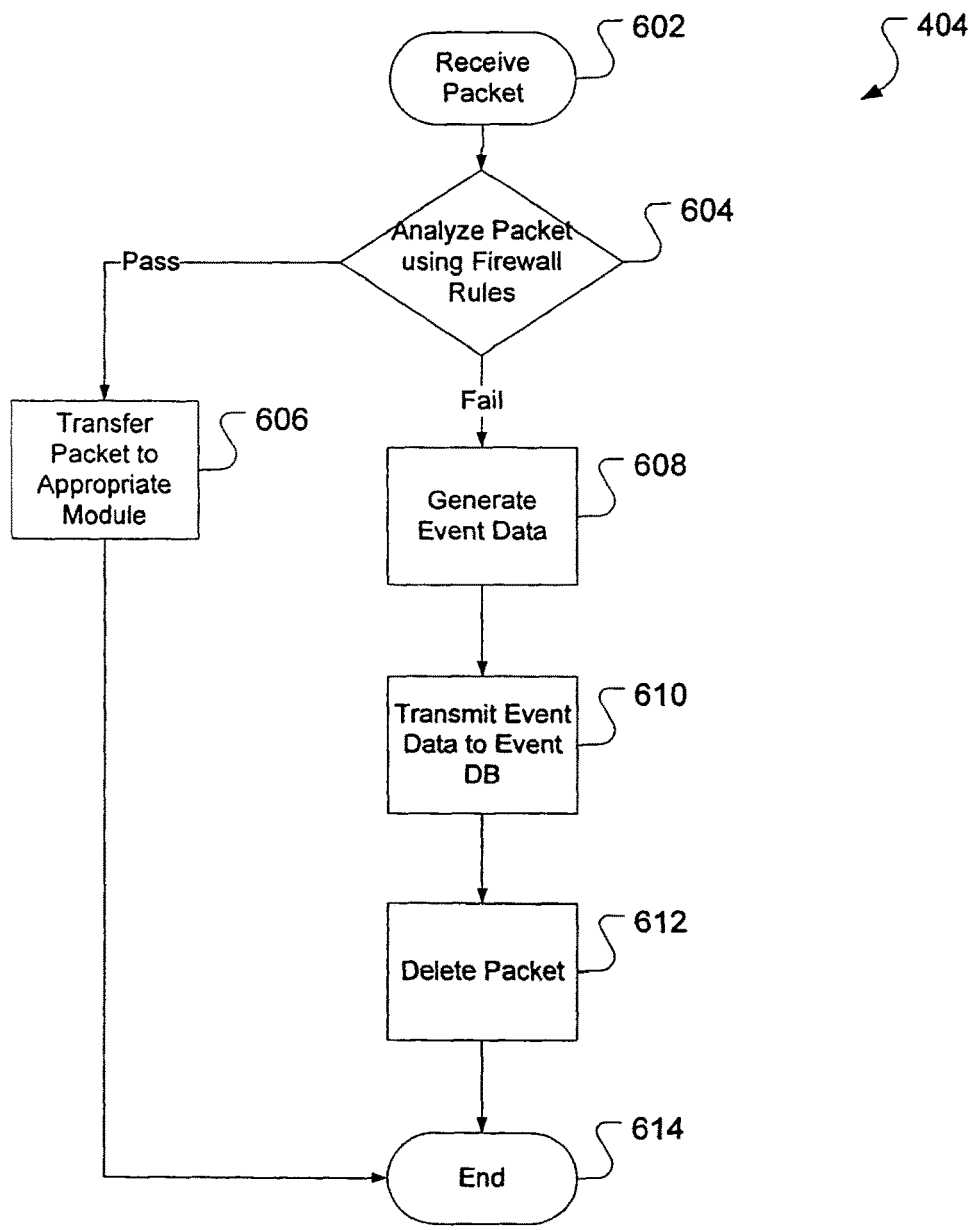
FIG. 6 illustrates an embodiment of the logical operations of the firewall analysis operation of FIG. 4.

FIG. 6 illustrates an embodiment of the logical operations of a firewall analysis operation 404. The flow starts when a packet is received from the IDS module in a receive packet operation 602.

After receipt of a packet passed by the IDS, a firewall rule analysis operation 604 is performed. The firewall rule analysis operation 604 determines if there are any firewall rules that indicate that the communication packet should be barred from entering the protected network 352 based on the information available in the packet. The firewall rules analysis operation 604 includes retrieving or otherwise accessing a pre-determined set of firewall rules. The firewall rules may be maintained in memory in the firewall module or may be stored in a remote database and may need to be retrieved as part of the firewall rules analysis operation 604.

The firewall rules analysis operation 604 compares the information in the communication packet against the rules of the firewall rules set. This may include reading some or all of the information from the communication packet such as a date and time the packet was received, the source of the packet, the destination of the packet, and the payload of the packet. Information may be read from the packet automatically or may be read in response to a specific firewall rule.

The firewall rules analysis operation 604 also identifies the type (i.e., in this embodiment e-mail, VPN, or web page) of the communication packet received. For embodiments A communication packet "passes" the firewall rule analysis operation 604 if there are no firewall rules that indicate that the communication packet should be barred from entering the protected network 352 and the packet's type can be identified. Thus, a packet that passes all the other firewall rules but for which a type cannot be identified fail the firewall rule analysis operation 604.

A communication packet that passes the firewall rules analysis is transferred to the appropriate module based on its type in a transfer to next module operation 606 and the operational flow ends 614 as discussed below.

A packet "fails" the firewall rules analysis operation 604 if the set of firewall rules contains at least one rule that indicates that the communication packet should be prevented from entering the protected network. A packet also fails the firewall rules analysis operation 604 if its type cannot be identified by the firewall. Upon determination that a packet has failed the firewall rules analysis operation 604, a generate event data operation 608 is performed. The generate event data operation 608 includes collecting certain information from the failed packet. This information includes at least the source of the packet and may include some or all of the event data described in Table 1 that is directly available from the packet. The event data may also identify the firewall rule or rules that the packet failed and may identify the firewall module as the module that failed the packet.

The generate event data operation 608 may also include assigning a priority to the packet. The priority may be dictated based on the firewall rule or rules that the packet failed. Alternatively, all packets failing the firewall may be assigned the same priority. For example, in an embodiment of the present invention all packets failing the firewall rules analysis operation 604 are assigned the intermediate priority of 2.

After the event data is generated, an event data message is created and transmitted to the SSI 312 in a transmit event data operation 610. If a priority was assigned in the generate event data operation 608, then the priority may be included with the other event data in the event data message.

Failure of a packet by the firewall rules analysis operation 604 also results in a delete packet operation 612. The delete operation 612 deletes the packet from the computer system 300, thereby preventing the packet from reaching its destination and freeing up resources for analysis of later received packets. In an embodiment, deleting the packet may include saving a copy of the packet to a deleted packet database for further analysis. One skilled in the art will recognize that the exact order of the operations described above with respect to the firewall analysis is exemplary only and that the operations may be reordered or modified without changing the fundamental function of the firewall analysis operation 404.

Upon completion of the firewall analysis operation 404, the operational flow ends 614 and the firewall module either reads the next packet received or goes into a standby mode waiting for the next communication packet to be received from the IDS module.

Figure 7:
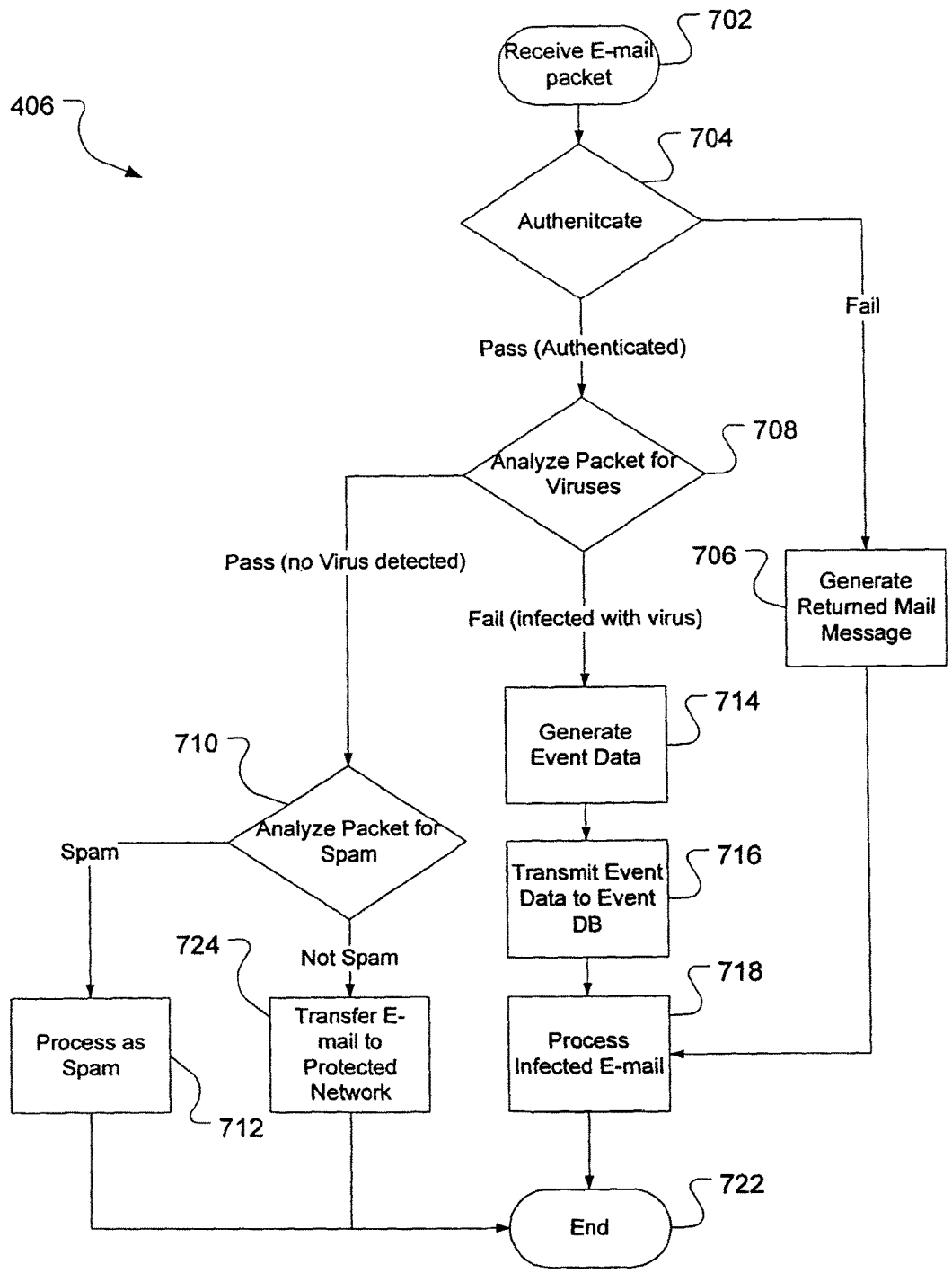
FIG. 7 illustrates an embodiment of the logical operations of the e-mail analysis operation of FIG. 4.

FIG. 7 illustrates an embodiment of the logical operations of an e-mail analysis operation 406. The flow starts when an e-mail packet is received from the firewall module in a receive packet operation 702. Packets received from the firewall module are placed in an e-mail queue. Depending on the implementation, some screening performed during the e-mail analysis operation 406 may be performed on individual packets are they are received, while other screening may be performed on complete e-mails only after all the packets are received.

After receipt of a packet passed by the firewall, an e-mail authentication operation 704 is performed which determines if the recipient identified by the e-mail is known to the e-mail system. This operation 704 may include checking the identified recipient against a database maintained by a local network directory service (such as a database maintained on a lightweight directory access protocol, or LDAP, server).

If an e-mail cannot be authenticated, a return e-mail generated to the e-mail sender in a return to sender operation 706. After the return to sender operation 706, a delete e-mail operation 730 is performed that deletes the e-mail from the memory of the computing system 300. After the delete operation 730, the operation flow ends with end operation 722 as described below.

If an e-mail is authenticated, i.e., the e-mail identifies a recipient known to the local network directory service, a virus analysis operation 708 is performed on the e-mail. The virus analysis operation 708 compares the content of the e-mail against a database of virus definitions. The database of virus definitions may be maintained by the virus detection module or may be stored in a remote database. An e-mail passes the virus analysis operation 708 if no virus is found that matches the definitions in the virus definition database.

If the e-mail passes the virus analysis operation 708, a spam analysis operation 710 is performed on the e-mail by the spam detection module 320. The spam analysis operation 710 compares the e-mail to a predetermined set of spam rules. The spam rules may be maintained in the spam detection module 320 or may be maintained in a remote spam rules database and accessed by the spam detection module 320 as needed.

E-mails that pass the spam analysis operation 710 (i.e., e-mails that are determined to not be spam) are transferred to the mail system in the protected network 352 in a transfer operation 724 after which operational flow ends in an end operation 722 as described below.

E-mails that fail the spam analysis operation 710 are processed in a spam processing operation 712 after which operational flow ends 722 as described below. The spam processing operation 712 may delete the e-mail or transmit the e-mail to a specific e-mail directory (within the protected network 352 or on the computing system 300). What processing occurs in the spam processing operation 712 may be dictated by the administrator or may be determined individually be each recipient.

Returning now to the virus analysis operation 708, if an e-mail fails the virus analysis operation 708 it has been determined to contain a virus based on one or more of the definitions in the virus definition database. Upon determination that a packet has failed the virus analysis operation 708, a generate event data operation 714 is performed. The generate event data operation 714 includes collecting certain information from the failed e-mail. This information includes at least the source of the e-mail and may include some or all of the event data described in Table 1 that is directly available from the e-mail. The event data may also identify the virus or viruses that the e-mail contained and may identify the virus detection module as the module that failed the packet.

The generate event data operation 714 may also include assigning a priority to the packet. The priority may be dictated based on the virus or viruses that the e-mail contained. Alternatively, all e-mails containing a virus may be assigned the same priority.

After the event data is generated, an event data message is created and transmitted to the SSI 312 in a transmit event data operation 716. If a priority was assigned in the generate event data operation 714, then the priority may be included with the other event data in the event data message.

An e-mail that fails the virus analysis operation 708 is processed in an infected e-mail processing operation 718. The infected e-mail processing operation 718 may include deleting the e-mail, disinfecting the e-mail and subsequently transferring the to the mail system in the protected network 352, or quarantining the e-mail as directed by the administrator of the computing system 300.

After an infected e-mail is processed and the generated event data is transmitted to the SSI 312, the operational flow ends with end operation 722. End operation 722 either causes the e-mail analysis operation 404 to be repeated on the next e-mail in the queue if the queue is not empty or causes the system to go into a standby mode waiting for the next communication packet to be received from the firewall module.

Figure 8:
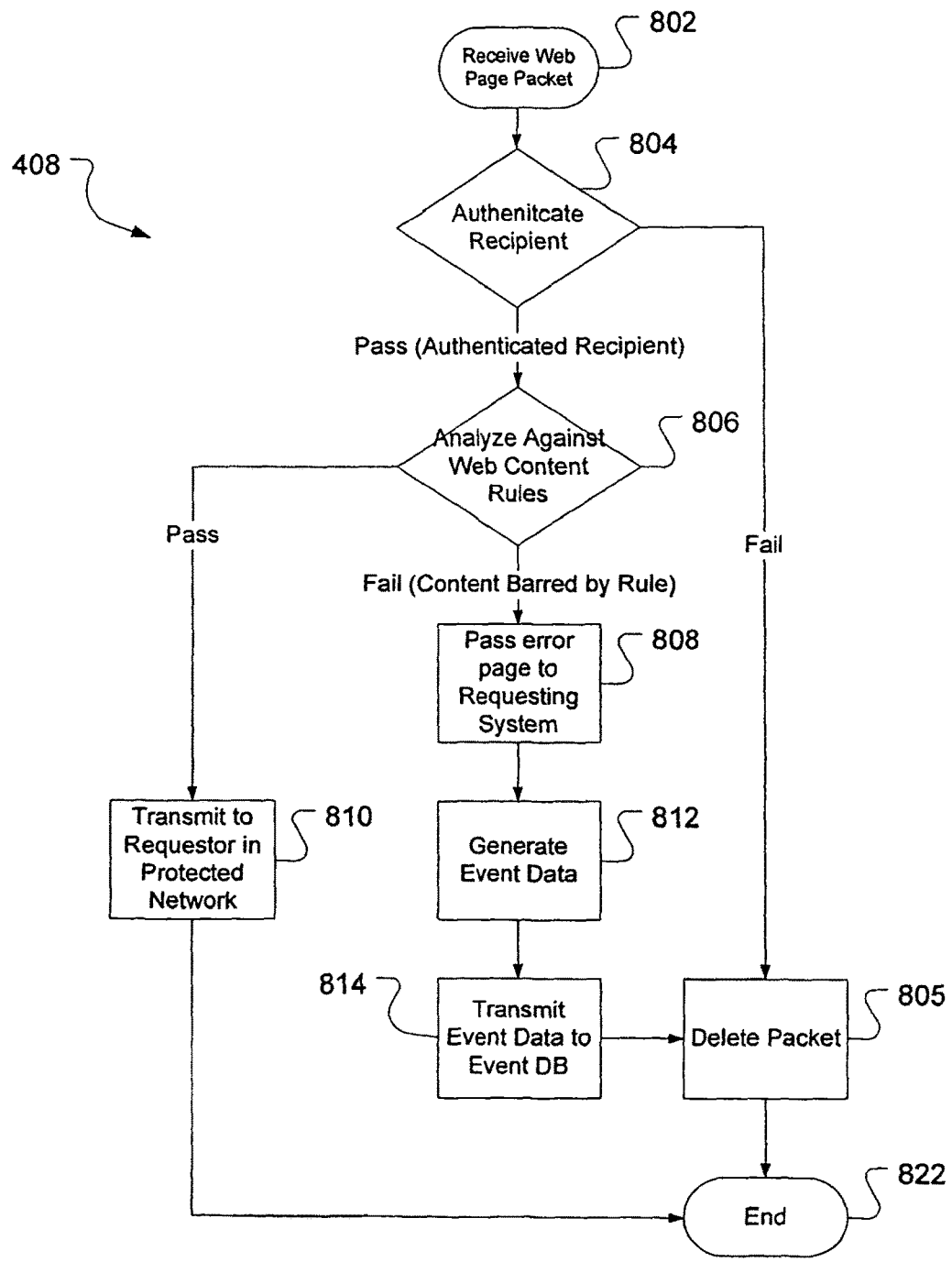
FIG. 8 illustrates an embodiment of the logical operations of the web content analysis operation of FIG. 4.

FIG. 8 illustrates an embodiment of the logical operations of a web content analysis operation 408. The flow starts when a web page packet is received from the firewall module in a receive packet operation 802. Web page packets received from the firewall module are stored in the web proxy 326. After receipt of a complete web page content element such as an .HTML page, image file, applet, etc., (hereinafter "a web page element"), passed by the firewall module, an authentication operation 804 is performed which determines if the recipient identified by the web page element is known to the web proxy. This operation 804 may include checking the identified recipient against a database maintained by a local network directory service (such as a database maintained on a lightweight directory access protocol, or LDAP, server).

If a web page element cannot be authenticated, a delete operation 805 is performed that deletes the web page element from the web proxy 326 and the operational flow then ends with an end operation 822 as described below.

However, if a web 906 page element is authenticated, i.e., the web page element identifies a recipient known to the local network directory service, a content analysis operation 806 is performed on the web page element. The content rules analysis operation 806 compares the content of the web page element against a set of content rules. The set of content rules is maintained in a database either within the web content module 322 or maintained in a remote location accessible to the web content module 322.

A web page element "passes" the content rules analysis operation 806 if no content rule is found in the database that bars the delivery of the content element. A web page element that passes the content rules analysis operation 806 is transmitted to the identified recipient within the protected network 352 in a transmit to requestor operation 810 after which operation flow ends in the end operation 822.

If a barring rule is found, the web page element "fails" the analysis and is deleted and a content error page is transmitted to the destination of the web page element (i.e., the web page requestor) in a content error operation 808.

After the content error operation 808, a generate event data operation 812 is performed. The generate event data operation 812 includes collecting certain information from the failed web page element. This information includes at least the source of the web page element and may include some or all of the event data described in Table 1 that is directly available from the web page element. The event data may also identify the content rule or rules that the web page element failed and may identify the web content module as the module that failed the element.

The generate event data operation 812 may also include assigning a priority to the web page element. The priority may be dictated based on the rule that the web page failed. Alternatively, all web page elements that fail may be assigned the same priority.

After the event data is generated, an event data message is created and transmitted to the SSI 312 in a transmit event data operation 814. If a priority was assigned in the generate event data operation 812, then the priority may be included with the other event data in the event data message.

After a failed web page element is deleted and the generated event data is transmitted to the SSI 312, the operational flow ends with an end operation 822 that returns the web proxy to a standby mode or begins the web content analysis operation 408 on the next web page element in the web proxy.

Figure 9:
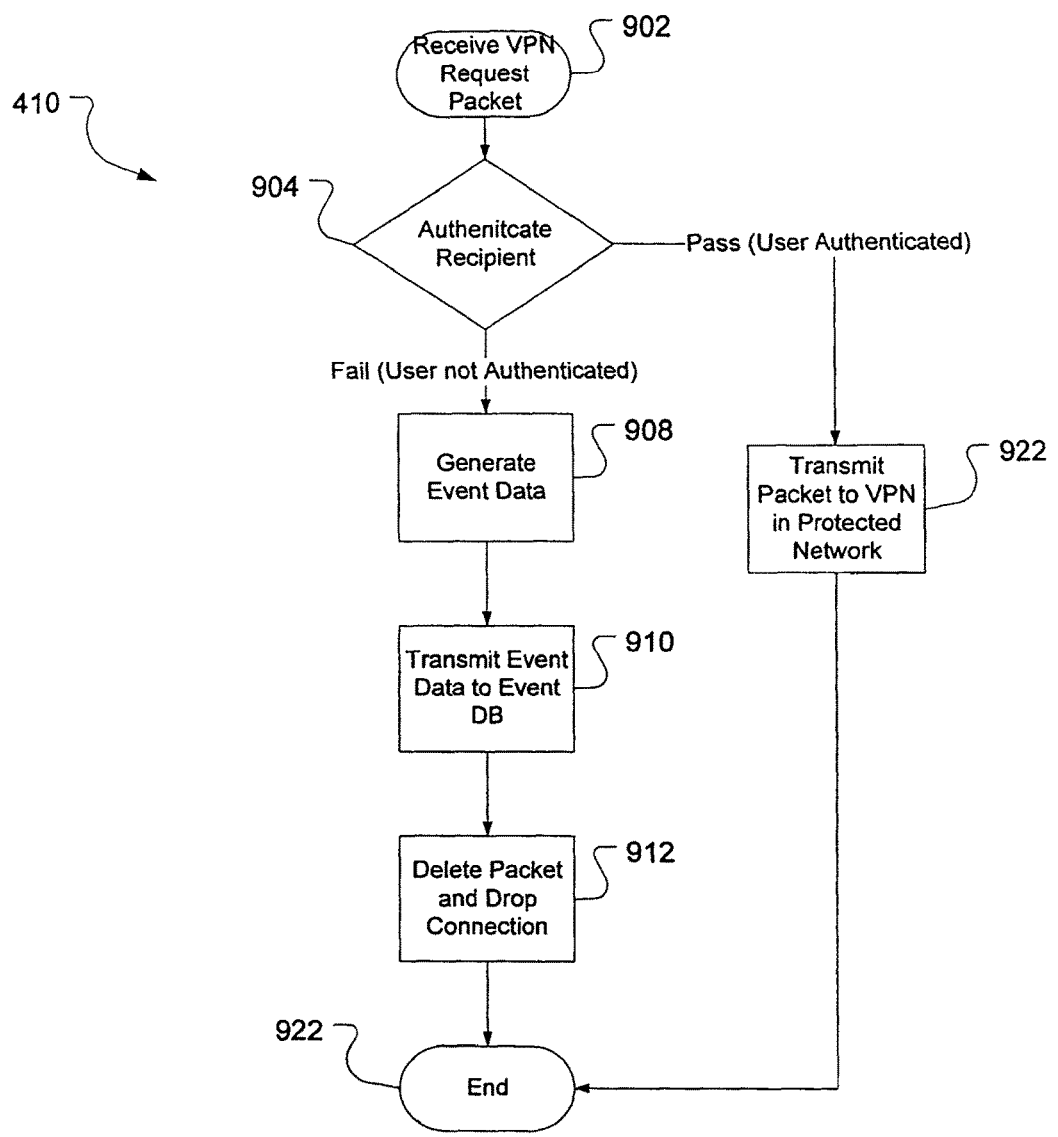
FIG. 9 illustrates an embodiment of the logical operations of the VPN analysis operation of FIG. 4.

FIG. 9 illustrates the logical operations of the VPN analysis operation 410. The operational flow starts when a VPN connection request is received from the firewall module in a receive packet operation 902. VPN connection requests received from the firewall module are stored in the VPN concentrator 328 until they are either deleted or passed to the VPN within the protected network 352.

A VPN connection request received by the VPN concentrator is analyzed in an authentication operation 904 which determines if the user identified as the author of the VPN connection request is a valid network user known to VPN. This operation 904 may include checking the identified user against a database maintained by a local network directory service (such as a database maintained on a lightweight directory access protocol, or LDAP, server).

If the identified user is a valid network user, the VPN connection request is authenticated and the connection to the VPN within the protected network is completed in a connect to VPN operation 906, after which the operational flow then ends with an end operation 922 as described below. After the initial connect request has been authenticated and a VPN connection open, all subsequent VPN traffic is still analyzed the SSI 312 the same way as regular, non-VPN communications (i.e., through the IDS module, the firewall module, etc.).

However, if user identified by the VPN connection request is not a valid network user, the VPN connection request "fails" the authentication operation 904. Upon determination that a VPN connection request has failed the authentication operation, a generate event data operation 908 is performed. The generate event data operation 908 includes collecting certain information from the failed VPN connection request. This information includes at least the source of the VPN connection request and may include some or all of the event data described in Table 1 that is directly available from the packet. The event data may also identify the VPN concentrator as the module that failed the packet.

The generate event data operation 908 may also include assigning a priority to the web page element. The priority may be dictated based on some analysis performed by the VPN concentrator or all VPN connection requests that are failed may be assigned the same priority.

After the event data is generated, an event data message is created and transmitted to the SSI 312 in a transmit event data operation 910. If a priority was assigned in the generate event data operation 908, then the priority may be included with the other event data in the event data message.

Failure of a packet by the authentication operation 904 also results in a delete VPN connection request packet operation 912. In the embodiment shown in FIG. 9, the delete operation 912 occurs after the transmit event data operation 910, although alternative embodiments are also contemplated. The delete operation 912 deletes the packet from the computer system 300, thereby preventing the packet from reaching its destination and freeing up resources for analysis of later received packets. In an embodiment, deleting the packet may include saving a copy of the packet to a deleted packet database for further analysis.

Upon completion of the above-described VPN analysis operations, the operational flow ends with an end operation 522 that returns the VPN concentrator to a standby mode or begins the authentication operation 904 on the next VPN connection request in the VPN concentrator if a second VPN packet is pending.

Figure 10:
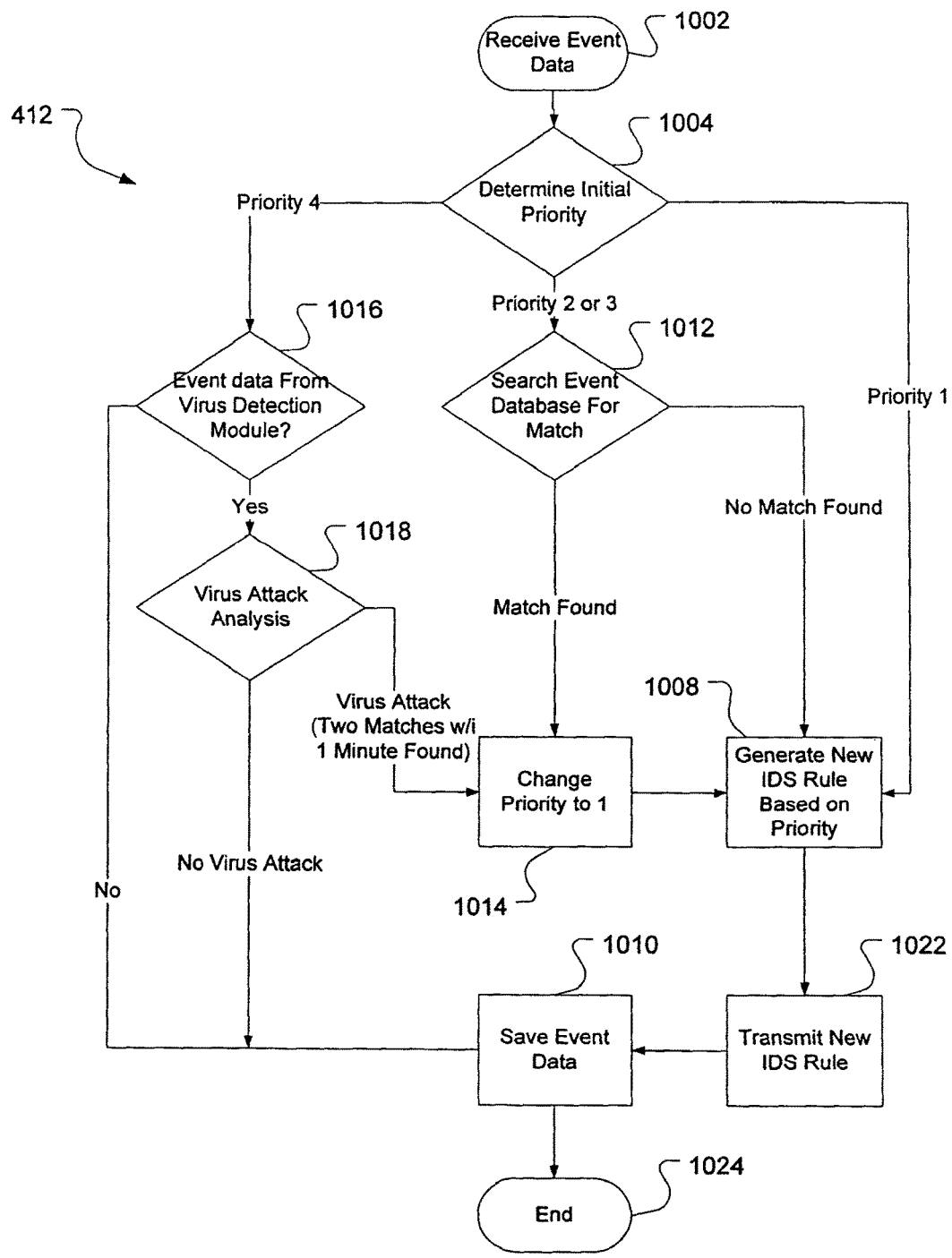
FIG. 10 illustrates an embodiment of the logical operations of the event data analysis operation of FIG. 4.

FIG. 10 illustrates the logical operations of the event data analysis operation 412. The operational flow starts when an event data message containing event data is received from a module in a receive event data operation 1002.

After receipt of the event data message, an initial priority operation 1004 is performed to determine the event data includes an assigned priority. If the event data in the message includes a priority assigned by the module that transmitted the event data, then the initial priority of the event is the assigned priority. If there is no assigned priority, then the initial priority operation 1004 assigns an initial priority to the event data. The assignment is made based on the information in the event data such as the module generating the event data, the reason for failure of the packet, or the type of packet.

For example, in an embodiment of the initial priority operation 1004 all packets failed by the firewall module are assigned an initial priority of 2 and packets failed by the IDS module are assigned an initial priority of 1, 2 or 3 depending on the IDS rule or rules that the packet failed. The rule or rules may be identified in the event data or the IDS rules analysis operation 504 may be repeated on the event data by the SSI 312 to identify the rule or rules as part of the assignment. In the embodiment, all packets failed by the virus detection module or the VPN concentrator are assigned an initial priority of 4.

If the initial priority operation 1004 determines that the event data has a priority of 1, then a generate rule operation 1008 is performed in which a priority 1 IDS rule is generated and transmitted to the IDS module for addition to the set of IDS rules maintained by the IDS. The generate rule operation 1008 is discussed in greater detail below.

However, if the if the initial priority operation 1004 determines that the event data has an initial priority of 2 or 3, a search operation 1012 searches the event database for an event record identifying the same packet source as that identified in the event data received in the receive event data operation 1002. If an event record is found with the same packet source, then an upgrade priority operation 1014 changes the priority of the event data to priority 1 and control transfers to the generate priority 1 rule operation 1008 previously discussed. However, if the search operation 1012 does not find an event record with the same source as that of the identified in the event data received in the receive event data operation 1002, then control transfers to the generate rule operation 1008 discussed below.

An embodiment of the search operation 1012 may also include performing a Bayesian analysis on the results of the search to verify that an upgrade in priority is warranted given the level of security desired by the administrator of the computing system 300. Such an analysis may be focused on reducing the number of false positives or increasing the relative percentage of true positives depending on the security preferences.

If the initial priority operation 1004 determines that event data does not have an initial priority of 1, 2 or 3, then a virus event operation 1016 determines if the event data message received in receive operation 1002 was generated by the virus detection module. If the event data message was not generated by the virus detection module, then control transfers to the save event data operation 1010.

If the event data message was generated by the virus detection module, then a virus attack detection operation 1018 is performed. The virus attack detection operation 1018 searches the event database event records indicating infected e-mails were previously received from the same source as the event data received in receive operation 1002. In an embodiment, a virus attack is presumed if a predetermined number of e-mails from the same source failed the virus detection module within a predetermined period of time. The number of e-mails and period used may be predetermined by the administrator of the computing system 300. In an embodiment, a virus attack is presumed if three or more virus-containing e-mails are received from the same source within a one-minute period. The SSI 312 makes the attack determination by searching the event database for records indicating receipt of the predetermined number of virus-containing e-mails within the period. If the virus attack detection operation 1018 finds that the virus attack criteria is not met, then operation flow transfers to the save event data operation 1010.

However, if the virus attack detection operation 1018 determines that the virus attack criteria are met, the priority of the event data is upgraded to a priority of 3 in a priority level 3 upgrade operation 1020. After the priority is upgraded to 3, the operation flow is transferred to the search operation 1012 described above.

Turning now to the generate rule operation 1008, the generate rule operation 1008 generates a rule for use by one or more modules in the computer system 300. For simplicity, the generate rule operation 1008 will be described in terms of generating an IDS rule that will be used by the IDS module in subsequent IDS analyses 402. However, the generate rule operation 1008 may also generate rules specifically for use by any of the other modules. The Such rule generation could be based on the type of communication or on the an IDS rule consistent with the final priority assigned by the SSI 312 to the event data received in an event data message. Thus, if the event data received is assigned a priority of 1, then the generate rule operation 1008 generates a priority 1 IDS rule. Similarly, if the event data received is assigned a priority of 2, then the generate rule operation 1008 generates a priority 2 IDS rule and if the event data received is assigned a priority of 3, then the generate rule operation 1008 generates a priority 3 IDS rule.

A priority 1 IDS rule is a rule that causes the IDS module to delete all packets received from the source identified in the event data for some predetermined blocking period, such as 24 hours, from the receipt of the packet that caused the event data to be generated. A priority 2 IDS rule is a rule that causes the IDS module to delete all packets received from the source identified in the event data for some predetermined blocking period less than that of the priority 1 IDS rule, such as 4 hours, from the receipt of the packet generating the event data. A priority 3 IDS rule is a rule that causes the IDS module to delete all packets received from the packet source identified in the event data for some predetermined period less than that of the priority 2 IDS rule, such as 1 hour, from the receipt of the packet generating the event data. The IDS rule generated may identify the source, such as the source IP address, and an expiration date and time for the IDS rule calculated based on the appropriate blocking period.

The IDS rule generated by the generate rule operation 1008 is added to the IDS rule database by a transmit new IDS rule operation 1022. The transmit new IDS rule operation 1022 may entail writing the new IDS rule directly to the IDS rule database or, if the IDS rule database is maintained by the IDS, may include transmitting the generated IDS rule to the IDS module for addition to the IDS rule database. Regardless of the implementation, the new IDS rule is ultimately added to the set of IDS rules used by the IDS module in the IDS rules analysis operation 504. Thus, based on the automated analysis of event data received from the monitoring modules, the new IDS rules are generated for the IDS module in real time as packets are received and evaluated by the monitoring modules.

Upon completion of the transmit IDS rule operation 1022, a save event data operation 1010 is performed that saves the event data received in the receive event data operation 1002 into a new event record. Some or all of the event data provided in the event data message may be saved in the new record. In addition, the final priority assigned to the event data is also saved in the event record. The save event data operation 1010 may also cause to be saved a log of the actions taken by the SSI 312 in response to receipt of the event data, such as a log identifying the generation of an IDS rule and transmission of a notification message in response to a rule generation.

Upon completion of the save event data operation 1010, the operational flow ends in an end operation 1024 which causes the SSI 312 to either repeat the event data analysis operation 412 on the next event data message pending analysis or enter a standby mode until the next event data message is received. In a multi-system implementation, the save event data operation 1010 may include transmitting the event data with its site-generated priority to the SSMI for additional analysis with the benefit of the event data received from other computing systems.

The operational flow described with reference to FIG. 10 is one embodiment of an event data analysis operation 412 that receives event data from a plurality of monitoring modules and, based on an analysis of the event data in real time, automatically generates one or more rules for the monitoring modules. Although the embodiment in FIG. 10 only generated rules for the IDS module, the scope of application is not limited. Alternative embodiments are possible and contemplated that generate rules for the other monitoring modules and also for monitoring modules that are not described in FIG. 3.

Turning now to a particular example of the operational flow of FIG. 10, consider event data received from a web content filter that failed a web page element being retrieved by a computing device in the protected network. In an embodiment, all web page content failure events are assigned a priority of 2 by the web content filter. The event data would be received by the SSI 312 in the received event data operation 1002. The initial priority operation 1004 would identify the event data as having an event priority of 2 and the search operation 1012 would search the database 310 for any other event records from the same IP address as the failed web page element. For the purposes of discussion, assume that the search 1012 found at least one other event record in the event database 310 indicates the source of the failing communication was the same IP address as the failed web page element. The upgrade priority operation 1014 changes the priority of the event data to a priority of 1 and a priority 1 rule is generated in the generate rule operation 1008. The transmit rule operation 1022 then transmits the new rule to the IDS blocking rule database. In the embodiment, this is achieved by either revising an expiration time of an existing IDS rule that blocks the web page element's source to 24 hours from the web page element's receipt or by adding a new rule to the rule database that blocks packets from the web page element's source for 24 hours from the time of receipt of the web page element. The event data including the newly assigned priority of 1 are then saved in the save event data operation 1010 and the SSI's 312 processing of that event ends.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. An integrated computing network security system configured to receive incoming communication data packets from an external communication network and transmit the incoming communication data packets to a protected network, the integrated computing network security system comprising:
    a threat event database;
    a plurality of monitors, each monitor in communication with the threat event database and configured to:
        analyze the incoming communication data packets from the external communication network and identify the communication packets that pose a security threat to the protected network by applying a plurality of security rules,
        generate a threat event data for each of the communication packets that were found to pose the security threat to the protected network, and
        transmit the threat event data for the security threat to a threat event database, the event data including a source IP address of the incoming communication data packets that were found to pose the security threat to the protected network,
wherein each of the plurality of monitors is configured to their respective threat event data in the threat event records of the threat event database;
a security system integrator configured to analyze the threat event data and the plurality of threat event records and, based on the results of the analysis, automatically generate at least one new security rule and add the at least one new security rule to the plurality of security rules before a subsequent incoming communication data packet is analyzed by the plurality of monitors.

2. The system of claim 1, wherein the step of analyzing by the security system integrator includes comparing the source IP address of the incoming communication data packets that were found to pose the security threat against the source IP addresses stored in the threat event records, and automatically generating a new blocking rule for all source IP addresses of the incoming communication data packets that were found to pose the security threat whose source IP addresses were not previously stored in the threat event records.

3. The system of claim 1, wherein at least one of the plurality of monitors is configured to automatically delete the incoming communication data packets found to pose a security threat to the protected network.

4. The system of claim 1, wherein each of the plurality of monitors independently performs the analysis of the incoming communication data packets from the external communication network.

5. The system of claim 1, wherein the threat event database configured to store the threat event records for the threat event data received from the plurality of monitors is a common database associated with each of the plurality of monitors.

6. An intrusion detection system for proactively detecting an intrusion attempt of a computing system, the system comprising:
an intrusion analysis monitor device coupled to an external communication network and the computing system such that an incoming data packet to the computing system cannot reach the computing system without passing through the intrusion analysis monitor device, the analysis monitor configured to:
analyze an incoming data packet to the computing system from the external communication network for intrusion potential using a set of intrusion detection rules, the incoming data packet containing a source IP address; and
upon determining that the incoming data packet is an intrusion attempt, but before analyzing an additional incoming packet for intrusion potential using the set of intrusion detection rules:
searching an intrusion event database for an intrusion event record associated with the source IP address of the incoming data packet, the search being performed while the incoming data packet is being analyzed for intrusion potential using the set of intrusion detection rules;
automatically generating a new intrusion rule to block a subsequent incoming packet from the source IP address of the incoming data packet in the located intrusion event record for a predetermined period of time when an intrusion event record corresponding to the source IP address of the incoming data packet is not located in the intrusion event database;
automatically storing the new intrusion rule in the set of intrusion detection rules; and
blocking the incoming data packet determined to be an intrusion attempt from reaching the computing system.

7. The system of claim 6, comprising a plurality of intrusion analysis monitor devices, each being coupled to the external communication network and to the computing system, wherein the intrusion event database is commonly accessed by the plurality of intrusion analysis monitor devices.

8. The system of claim 7, wherein each of the intrusion analysis monitor devices are configured to perform a different type of intrusion detection analysis.

9. The system of claim 6, wherein the intrusion analysis monitor is a firewall monitor.

10. The system of claim 6, wherein the intrusion analysis monitor is a virus detection monitor.

11. The system of claim 6, wherein the intrusion analysis monitor is a VPN authentication monitor.

12. The system of claim 6, wherein at least some of the intrusion event records comprise intrusion event data provided by a plurality of different types of intrusion analysis monitor devices.

13. The system of claim 6, wherein the intrusion analysis monitor device is further configured to block a subsequent incoming packet from the source IP address of the incoming data packet in the located intrusion event record for a predetermined period of time when intrusion event record corresponding to the source IP address of the incoming data packet is located in the intrusion event database.

14. The method of claim 6 further comprising: a plurality of intrusion analysis monitor devices, each being coupled to the external communication network and to the computing system, and each being further configured to generate an intrusion event data for the incoming data packet determined to be an intrusion attempt, the intrusion event data including the source IP address of the incoming data packet, and to transmit the intrusion event data to the intrusion event database.

15. A method of automatically generating rules for proactively detecting an intrusion attempt of a computing system, the method comprising:
analyzing an incoming data packet to the computing system from an external communication network for intrusion potential using a set of intrusion detection rules, the incoming data packet containing a source IP address;
searching an intrusion event database for an intrusion event record associated with the source IP address of the incoming data packet while the incoming data packet is being analyzed for intrusion potential using the set of intrusion detection rules;
blocking the packet from reaching the computing system if the intrusion event database contains an event record associated with the source IP address of the packet;
blocking the packet from reaching the incoming packet is determined to be an intrusion attempt using the set of intrusion detection rules;
generating automatically a new intrusion rule to block a subsequent incoming packet from the source IP address of the incoming data packet if the intrusion event database does not contain an event record associated with the source IP address of the packet and if the incoming data packet is determined to be an intrusion threat;

passing the incoming data packet to the computing system if the incoming data packet is determined to not be an intrusion threat and if the intrusion event database does not contain an event record associated with the source IP address of the packet adding any new intrusion rule to the set of intrusion detection rules before analyzing the subsequent incoming packet for intrusion potential using the set of intrusion detection rules.

16. The method of claim 15, wherein the intrusion event database is commonly accessed by a plurality of different types of packet analysis monitors.

17. The method of claim 16, further comprising: generating, by one of the plurality of packet analysis monitors, intrusion event data based on the incoming data packet, the intrusion event data including the IP address of the incoming data packet, and transmitting the intrusion event data to the intrusion event database.

18. The method of claim 15, wherein the intrusion event record associated with the source IP address of the incoming data packet was created from intrusion event data received from a firewall monitor.

19. The method of claim 15, wherein the intrusion event record associated with the source IP address of the incoming data packet was created from intrusion event data received from a virus detection monitor.

20. The method of claim 15, wherein the intrusion event record associated with the source IP address of the incoming data packet was created from intrusion event data received from a plurality of different types of monitors.

* * * * *